(12) United States Patent
Oechsle et al.

(10) Patent No.: US 10,961,128 B2
(45) Date of Patent: Mar. 30, 2021

(54) WATER PROCESSING DEVICE

(71) Applicant: Pall Corporation, Port Washington, NY (US)

(72) Inventors: Dietmar Oechsle, Schwäbisch Gmünd (DE); Christian Dahlberg, Bempflingen (DE); Steffen Key, Magstadt (DE)

(73) Assignee: Pall Corporation, Port Washington, NY (US)

( * ) Notice: Subject to any disclaimer, the term of this patent is extended or adjusted under 35 U.S.C. 154(b) by 133 days.

(21) Appl. No.: 16/157,385

(22) Filed: Oct. 11, 2018

(65) Prior Publication Data
US 2019/0039914 A1 Feb. 7, 2019

Related U.S. Application Data

(63) Continuation of application No. PCT/EP2017/059553, filed on Apr. 21, 2017.

(30) Foreign Application Priority Data

Apr. 22, 2016 (DE) .......................... 102016107483.7

(51) Int. Cl.
*C02F 1/28* (2006.01)
*C02F 1/00* (2006.01)
(Continued)

(52) U.S. Cl.
CPC ............ *C02F 1/003* (2013.01); *B01D 61/147* (2013.01); *B01D 69/08* (2013.01); *B01J 20/12* (2013.01);
(Continued)

(58) Field of Classification Search
None
See application file for complete search history.

(56) References Cited

U.S. PATENT DOCUMENTS 4,042,498 A * 8/1977 Kennedy .................. B01J 20/22
210/664
5,032,269 A * 7/1991 Wollbeck ............. B01D 63/021
210/321.8
(Continued)

FOREIGN PATENT DOCUMENTS

DE 10 2004 037 475 A1 3/2006
DE 20 2006 004 182 U1 11/2006
(Continued)

OTHER PUBLICATIONS

International Bureau, International Search Report in International Application No. PCT/EP2017/059553, dated Jul. 7, 2017.

*Primary Examiner* — Matthew O Savage
(74) *Attorney, Agent, or Firm* — Leydig, Voit & Mayer, Ltd.

(57) ABSTRACT

A water processing device is provided for removing micro-pollutants, in particular medicaments, from water, the device comprising at least one filter unit which is provided for at least one filtering of water in at least one operating state and which comprises at least one tubular filter element with at least two end portions, and comprising at least one adsorption unit which at least partially adsorbs the micro-pollutants in at least one operating state, wherein the at least two end portions enclose an inner angle of from 0° to 90° when in the assembled state.

13 Claims, 8 Drawing Sheets

Figure 1:
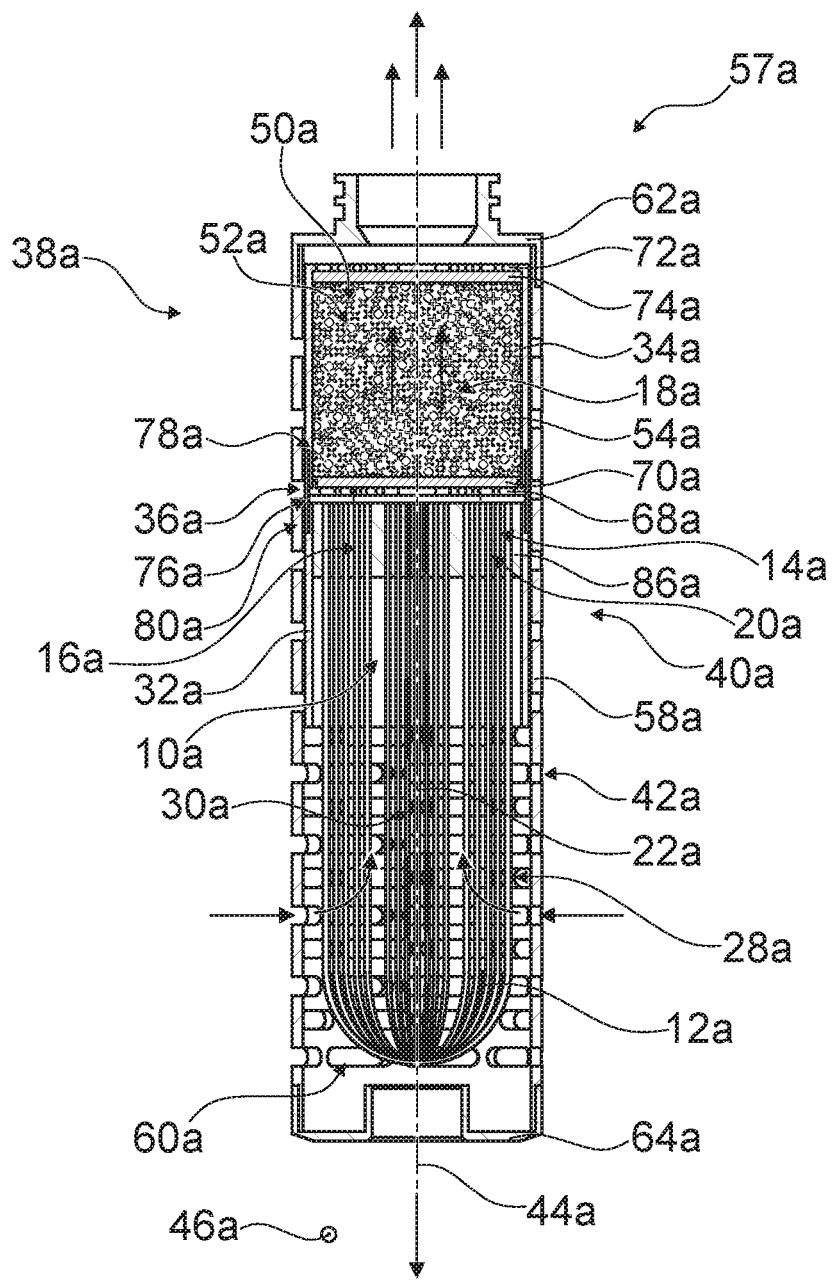

(51) Int. Cl.
*C02F 1/42* (2006.01)
*C02F 1/44* (2006.01)
*C02F 9/00* (2006.01)
*B01D 61/14* (2006.01)
*B01D 69/08* (2006.01)
*B01J 20/12* (2006.01)
*B01J 20/20* (2006.01)
*B01J 20/26* (2006.01)
*C02F 101/20* (2006.01)
*C02F 101/30* (2006.01)
*C02F 101/34* (2006.01)
*B01D 63/02* (2006.01)
*C02F 101/36* (2006.01)
*C02F 101/38* (2006.01)

(52) U.S. Cl.
CPC ............... *B01J 20/20* (2013.01); *B01J 20/26* (2013.01); *C02F 1/281* (2013.01); *C02F 1/283* (2013.01); *C02F 1/285* (2013.01); *C02F 1/286* (2013.01); *C02F 1/42* (2013.01); *C02F 1/44* (2013.01); *C02F 1/444* (2013.01); *C02F 9/005* (2013.01); *B01D 63/024* (2013.01); *C02F 2001/422* (2013.01); *C02F 2001/425* (2013.01); *C02F 2101/20* (2013.01); *C02F 2101/305* (2013.01); *C02F 2101/306* (2013.01); *C02F 2101/34* (2013.01); *C02F 2101/36* (2013.01); *C02F 2101/38* (2013.01); *C02F 2101/40* (2013.01); *C02F 2201/003* (2013.01); *C02F 2201/006* (2013.01); *C02F 2307/06* (2013.01)

(56) References Cited

U.S. PATENT DOCUMENTS

| | | | |
|---|---|---|---|
| 2008/0105618 A1* | 5/2008 | Beckius | B01D 63/024 210/650 |
| 2010/0108612 A1* | 5/2010 | Edmiston | C08G 77/48 210/691 |
| 2015/0053620 A1* | 2/2015 | Suri | C02F 1/285 210/670 |

FOREIGN PATENT DOCUMENTS

| | | |
|---|---|---|
| DE | 10 2013 107 433 A1 | 1/2015 |
| EP | 2 733 120 A1 | 5/2014 |
| EP | 2 754 642 A1 | 7/2014 |
| JP | 2012030218 A * | 2/2012 ......... B01D 39/2062 |
| WO | WO 03/089104 A2 | 10/2003 |

* cited by examiner

WATER PROCESSING DEVICE

CROSS-REFERENCE TO RELATED APPLICATIONS

This patent application is a Continuation of International Patent Application No. PCT/EP2017/059553, filed Apr. 21, 2017, which claims the benefit of German Patent Application No. 10 2016 107 483.7, filed Apr. 22, 2016, which are each incorporated by reference.

BACKGROUND OF THE INVENTION

The invention relates to a water processing device according to the preamble of claim 1.

Water processing devices which use filter units and adsorption units in order to process water so as to remove pollutants from water have already been proposed. Whereas a processing efficiency is sufficient for most of the pollutants contained in the water, the processing efficiency of water processing devices of this kind in respect of micro-pollutants is significantly reduced, since these pollutants on the one hand are present in a much lower concentration and on the other hand have at least substantially lower molecular weights. Although the concentrations of the individual micro-pollutants usually lie below the critical tolerance limits for the environment and humans, a sum parameter of the various micro-pollutants is not taken into consideration. It is therefore of great interest to remove these pollutants from water with increased efficiency.

BRIEF SUMMARY OF THE INVENTION

The object of the invention is in particular to provide a device of this kind having improved properties in respect of its efficiency, in particular processing efficiency. The object is achieved in accordance with the invention by the features of claim 1, whereas advantageous embodiments and developments of the invention can be derived from the dependent claims.

The invention relates to a water processing device which is provided for removing micro-pollutants, in particular medicaments, from water, said device comprising at least one filter unit which is provided for at least one filtering of water in at least one operating state and which comprises at least one tubular filter element with at least two end portions, and comprising at least one adsorption unit, which at least partially adsorbs the micro-pollutants in at least one operating state.

It is proposed that the end portions enclose an inner angle of from 0° to 90° when in the assembled state. The efficiency, in particular processing efficiency, can be improved as a result. In particular, the flow rates in the case of cross-flow filtration can be improved.

The term "provided" shall be understood here in particular to mean specially designed and/or equipped. The fact that an object is provided for a specific function shall be understood in particular to mean that the object fulfils and/or carries out this specific function in at least one application and/or operating state. A "water processing device" shall be understood in particular to mean a device which is provided for processing, purifying, clarifying, cleaning and/or purging water, in particular drinking water, and advantageously for removing micro-pollutants, in particular in that these are filtered and/or sorbed from the water, in particular absorbed and/or particularly preferably adsorbed. The water processing device is in particular at least a part, in particular a subassembly, of a water processing cartridge, a system for water processing and/or a water processing plant, such as a sewage treatment plant. In particular, the water processing device can fully comprise the water processing cartridge, the system for water processing and/or the water processing plant. In particular, the water processing device can be connected, advantageously directly, to a domestic water supply, preferably to a water tap, and in particular is arranged upstream thereof in respect of the flow direction. An "operating state" of the water processing device shall be understood in particular to mean a state in which water is flowed through the water processing device fully. The term "micro-pollutants" shall be understood in particular to mean pollutants such as industrial chemicals, medicaments, in particular carbamazepine, sulfamethoxazole, diclofenac and/or ethinylestradiol, heavy metals and/or pesticides, which are present in the water, in particular dissolved therein, in a low concentration, more specifically in particular in a concentration of less than 10,000 ppm, preferably less than 1000 ppm, more preferably less than 100 ppm, and particularly preferably less than 10 ppm. In particular, the micro-pollutants have a molecular weight of less than 100 kDa, preferably less than 10 kDa, more preferably less than 1 kDa, and particularly preferably less than 0.1 kDa.

An "adsorption unit" shall be understood in particular to mean a unit having at least one adsorption element, which is provided for at least substantially securely binding and/or adsorbing a micro-pollutant, in particular a dissolved micro-pollutant, in particular by means of at least one adsorbent, preferably a plurality of adsorbents, more specifically in particular on a surface, preferably in a cavity, and particularly preferably in a pore of the adsorbent. In particular, the underlying adsorption mechanism for binding the micro-pollutants is different from a covalent bonding. The adsorption element is advantageously provided for at least substantially securely binding the micro-pollutants by means of the Coulomb and/or van der Waals interaction. The expression "at least substantially securely binding a micro-pollutant" shall be understood in particular to mean that an adsorbed micro-pollutant is washed out in a wash-out test by means of flushing with water within a period of time of at least one hour, advantageously at least two hours, and preferably at least four hours, to an extent of at most one percent, advantageously at most half a percent, and preferably at most a tenth of a percent of a bound substance quantity. The adsorption unit is in particular at least partially chemically regenerable. The term "chemically regenerable" shall be understood in particular to mean that the at least one adsorbent can be regenerated by means of a chemical reaction. In particular, the adsorbent can be chemically regenerated by means of an acid and/or a lye, preferably sodium hydroxide. The adsorbent is also chemically regenerable in particular by means of a saline solution, preferably a NaCl solution. Alternatively or additionally, the adsorbent can be regenerated in particular by being exposed to energy, for example in the form of heat and/or electromagnetic radiation, in particular by being exposed to light, preferably UV light. The adsorption unit is formed in particular as an advantageously water-permeable solid block or as a fill, which block/fill is formed at least in part by at least one adsorption element.

The adsorption unit preferably comprises at least one specific and/or non-specific adsorption element. A "non-specific adsorption element" shall be understood in particular to mean an adsorption element which comprises at least one non-specific adsorbent, which is provided for adsorbing a plurality of micro-pollutants chemically non-specifically, in particular to the same extent and preferably independently of functional groups of the micro-pollutants and/or a charge of the micro-pollutants. The non-specific adsorbent is provided in particular for adsorbing various micro-pollutants in a sterically dependent manner. The non-specific adsorption element can advantageously comprise a plurality of non-specific adsorbents. A "specific adsorption element" shall be understood in particular to mean an adsorption element which comprises at least one specific adsorbent, which is provided for adsorbing specific micro-pollutants in a chemically or physically specific manner, in particular to a different extent and preferably depending on functional groups of the micro-pollutants and/or a charge of the micro-pollutants. The specific adsorbent is provided in particular for adsorbing certain micro-pollutants sterically independently. The specific adsorption element can advantageously comprise a plurality of specific adsorbents.

Alternatively or additionally, the adsorption unit can be formed at least partially in one piece with a further body, for example the filter unit, more specifically advantageously in the form of an impregnation and/or coating. The expression "formed at least partially in one piece" shall be understood in this context in particular to mean that at least one component of at least one object is formed in one piece with at least one component of at least one further object. The term "in one piece" shall be understood in particular to mean connected at least by a substance-to-substance bond, for example by a welding process, an adhesive process, an injection moulding process, and/or another process appearing expedient to a person skilled in the art. The term "in one piece" shall advantageously also be understood to mean "in one part". The term "in one part" shall be understood in particular to mean formed in a single piece, for example by production from a casting and/or by production in a one-component or multi-component injection moulding method advantageously from an individual blank, and particularly preferably in a spinning method, in particular a wet spinning method, such as reactive spinning, in which the filter unit is produced with integrated adsorbent in particular in a phase inversion process.

A "filter unit" shall be understood in particular to mean a membrane filter unit provided for cleaning micro-pollutants from water by retaining the micro-pollutants at pores of the filter membrane. The filter element of the filter unit is formed in particular as a filter membrane and advantageously as a hollow-fibre filter membrane, in which a wall of the filter element forms the membrane and defines a hollow channel. In principle, the filter element can perform a cleaning of water guided in the hollow channel as the water passes from the closed hollow channel through the filter element into an external space, such that water leaving the hollow channel is cleaned, or the filter element can preferably perform a cleaning of water entering the hollow channel from the external space, the water then being guided in the cleaned state in the hollow channel. The filter unit in particular comprises at least one filter element, preferably at least 5 filter elements, preferably at least 10, and particularly preferably at least 20 filter elements.

An "end portion" of an object shall be understood in particular to mean a portion which extends along an extent, in particular a main extent, of the object as far as an end of the object. The end portion extends along the filter element in particular over at most 10 cm, preferably over at most 5 cm, and particularly preferably over at most 1 cm.

An "inner angle" shall be understood in particular to mean an angle which is enclosed by two vectors which each run parallel to one of the two end portions respectively and which point in the direction of the end of the respective end portions having an opening.

In particular, the filter element, when in the assembled state, is bent at least in portions and is preferably looped. In order to achieve a particularly efficient arrangement of the filter element and advantageously increase flow rate, it is proposed that the filter element, when in the assembled state, is bent at least substantially in a U-shaped manner. The two end portions of the filter element are in particular at least substantially parallel, advantageously anti-parallel, to one another when in the assembled state. The filter element preferably has a plane of main extent which, in the assembled state, intersects the filter element over the entire extent of the filter element. A "plane of main extent" of an object shall be understood in particular to mean a plane which is parallel to the largest side face of the smallest imaginary cuboid which just fully surrounds the object, and runs through the centre point of the cuboid. The term "substantially parallel" shall be understood here in particular to mean the orientation of a direction relative to a reference direction, in particular in a plane, wherein the direction has a deviation in relation to the reference direction in particular of less than 8°, advantageously less than 5°, and particularly advantageously less than 2°.

It is also proposed that the water processing device comprises a holding element, which arranges the end portions fixedly relative to one another in the assembled state. The two end portions of the filter element are in particular fixedly connected to the holding element, preferably at least with a substance-to-substance bond, in the assembled state. The holding element is advantageously formed by a binder, for example an adhesive, preferably a resin, and particularly preferably an epoxy resin. The filter element, in particular the end portions of the filter element, is/are sealed off, in particular at least in part, in such a way that infiltration of the binder into the filter element, in particular into the wall of the filter element, in particular at the end portions, is avoided. At the time of assembly, the end portions are in particular arranged in the binder, which is still liquid. The binder is advantageously cured. The cured binder is also in particular ground in such a way that openings in the end portions of the filter element are exposed. The holding element is preferably cylindrical, tubular and/or planar. The filter element hereby can be fixedly arranged in a simple way.

It is also proposed that the filter unit comprises at least one further filter element, which is formed at least substantially equivalently to the filter element and which surrounds the filter element at least in part. The fact that "two objects are at least substantially equivalent" shall be understood in particular to mean that they, in particular when assembled, are largely identical, preferably have the same shaping and in particular orientation, and preferably differ from one another merely by production tolerances and/or manufacturing defects. In particular, the further filter element is looped in a similar way to the filter element. In addition, the filter elements formed equivalently can differ from one another in particular by a length. The filter element and the further filter element, in particular the end portions of the filter element and the end portions of the further filter element, are arranged at least substantially parallel or preferably anti-parallel to one another, at least in part. The fact that "a further object at least partially surrounds an object" shall be understood in particular to mean that at least one straight line exists which runs firstly through the further object, then through the first object, and then again through the further object. The filter unit can also comprise additional filter elements, in particular a multiplicity of additional filter elements, in particular additional filter elements formed at least substantially equivalently to the filter element, which in turn surround the filter element and the further filter element. Alternatively, the further filter element can be arranged next to the filter element. In particular, the installation space can be reduced hereby, and the fill density of the filter unit can be improved advantageously.

In a preferred embodiment of the invention, it is proposed that the filter element, when assembled, has a plane of main extent and the further filter element, when assembled, as a further plane of main extent, which is different from the plane of main extent of the filter element. In particular, the plane of main extent of the filter element can be arranged at least substantially parallel to the further plane of main extent of the further filter element. A simple arrangement of the filter elements can be achieved hereby.

In a further preferred embodiment of the invention it is proposed that the plane of main extent of the filter element and the further plane of main extent of the further filter element are arranged at an angle to one another. Surface normals of the plane of main extent of the filter element and of the further plane of main extent of the further filter element preferably enclose an angle of at least 20°, preferably of at least 50°, and particularly preferably of at least 80° and/or in particular of at most 160°, preferably of at most 130°, and particularly preferably of at most 100°. The plane of main extent of the filter element and the further plane of main extent of the further filter element are advantageously arranged at least substantially at right angles to one another. The expression "at least substantially at right angles" shall be understood here in particular to mean an orientation of a direction relative to a reference direction, wherein the direction and the reference direction, in particular considered in a plane, enclose an angle of 90° and the angle in particular has a maximum deviation from 90° of in particular less than 8°, advantageously less than 5°, and particularly advantageously less than 2°. A homogeneous flow through the filter elements can be achieved hereby.

In order to further improve in particular a fill density of the filter unit and advantageously a homogeneous flow through the filter elements, it is proposed that the filter unit comprises a group of filter elements and a further group of filter elements. The group of filter elements comprises at least one additional filter element, in particular a plurality of additional filter elements, which is/are formed at least substantially equivalently to the filter element. The further group of further filter elements comprises at least one additional further filter element, in particular a plurality of additional further filter elements, which is/are formed at least substantially equivalently to the further filter element. The filter elements of a group are preferably bundled by means of a mesh. In particular, at least one of the further filter elements of the further group preferably surrounds, in each case, preferably at least one of the filter elements of the first group of filter elements. In particular, at least one of the further filter elements of the further group of further filter elements preferably has, in each case, at least one plane of main extent, which, in each case, is different at least preferably from at least a plane of main extent of at least one filter element of the first group of filter elements. Alternatively or additionally, the filter unit can comprise only one of the groups or additional groups, in particular with additional filter elements which advantageously surround the filter element and the further filter element.

In a preferred embodiment of the invention, it is proposed that the filter unit is at least substantially tubular. Filter elements of the filter unit are preferably arranged in a circular manner and at least in part form a tube wall of the filter unit. The tubular filter unit in particular defines a tube channel, in which the adsorption unit can be arranged advantageously at least in part. The installation space can be further reduced hereby.

In a further preferred embodiment of the invention, it is proposed that the adsorption unit is at least substantially tubular. The tubular adsorption unit in particular defines a tube channel, in which the filter unit can be arranged advantageously at least in part. The installation space can be further reduced hereby.

In order to protect the adsorption unit against damage, it is proposed that the water processing device comprises a filter housing, in which the filter unit is arranged at least in part. The filter housing is formed in particular as a hollow cylinder, which preferably has a cylinder jacket partially surrounding the filter unit. The filter unit is in particular arranged in the filter housing to an extent of less than 80%, preferably less than 60%, and particularly preferably less than 40%. The cylinder jacket also in particular surrounds the holding element at least in part, preferably at least to a large extent, and particularly preferably completely. In particular, the holding element is connected to the filter housing by a substance-to-substance bond.

In order to protect the filter unit against damage, it is proposed that the water processing device comprises an adsorption housing, in which the adsorption unit is arranged at least in part, in particular to a large extent, and preferably completely. The adsorption housing is formed in particular as a hollow cylinder, which preferably has a cylinder jacket surrounding the adsorption unit at least partially, in particular at least to a large extent, and preferably completely. The expression "at least to a large extent" shall be understood here in particular to mean more than 50%, advantageously more than 65%, preferably more than 75%, particularly preferably more than 85%, and particularly advantageously at least 95%. The adsorption unit can be protected against damage hereby.

It is also proposed that the filter housing is arranged upstream of the adsorption housing in respect of the flow direction. In particular, the filter unit arranged in the filter housing is arranged upstream, in respect of the flow direction, of the adsorption unit arranged in the adsorption housing. An efficient arrangement and in particular a resultant efficient flow through the adsorption housing can be achieved hereby.

It is conceivable in particular that the filter housing and the adsorption housing are formed in one piece with one another. In order to increase the flexibility of the water processing device and in particular convenience for the customer, and in order to enable individual components of the water processing device to be replaced, it is proposed that the water processing device comprises a connection unit, which connects the adsorption housing and the filter housing to one another when these are in the assembled state. The connection unit is in particular provided for an at least positively-locking connection of the adsorption housing and the filter housing, Alternatively or additionally, the connection unit can also be provided for connection with a force-locking connection and/or a substance-to-substance bond. The connection unit is in particular formed at least partially in one piece with the adsorption housing and/or the filter housing. The connection unit comprises at least one connection element, which, in the assembled state, connects the filter housing to the adsorption housing. The connection element is in particular formed separately from the adsorption housing and/or the filter housing. The connection element is preferably formed as a preferably tubular sleeve. The connection unit also comprises at least one connection element receptacle, which is provided for receiving the connection element. The connection element receptacle is formed as a recess in the filter housing and/or the adsorption housing.

It is also proposed that the water processing device comprises at least one screen unit separating the filter housing and the adsorption housing from one another and at least partially closing at least the adsorption housing from at least one side. The screen unit in particular comprises at least one screen cover, which is at least provided for separating the adsorption unit from the filter unit. The screen cover in particular comprises a plurality of through-openings in order to allow a flow of water between the filter unit and adsorption unit. The screen cover can be connected to the adsorption housing in particular with positive engagement. Alternatively or additionally, the screen cover can be formed in one piece with the adsorption housing. The screen unit in particular also comprises at least one frit, preferably a porous frit. The fruit is arranged in particular on a side of the screen unit facing towards the adsorption unit and is provided preferably for preventing a contamination of the adsorption unit and particularly preferably for preventing the adsorption unit from escaping from the adsorption housing. The frit is formed in particular from a preferably cross-linked plastics material, in particular from at least one cross-linked polymer, advantageously polyethylene. Alternatively or additionally, the frit can be formed at least partially in one piece with the adsorption unit. In particular, the protection of the sensitive filter unit can be improved hereby, since said filter unit can be protected against particles leaving the adsorption unit, in particular in the event that this is damaged.

It is also proposed that the water processing device comprises a cartridge, in which, in the assembled state, the adsorption housing and the filter housing are arranged and which comprises openings, which are arranged offset relative to one another in the peripheral direction as considered in the axial direction. The term "axial direction" shall be understood in particular to mean a main direction of extent and/or preferably an axis of rotational symmetry of the cartridge, in which said cartridge advantageously has at least threefold rotational symmetry. A "main direction of extent" of an object shall be understood here in particular to mean a direction running parallel to the longest edge of the smallest imaginary cube just surrounding the object completely. A "peripheral direction" shall be understood in particular to mean a direction perpendicular to the main direction of extent and/or in particular a rotary direction about the axis of rotational symmetry of the cartridge. In particular, the openings are arranged around at least a majority of the cartridge in the peripheral direction. The openings are provided in particular so as to allow water that is to be processed to flow against the filter unit. The cartridge advantageously comprises further openings, which are arranged along the axial direction and in particular along the peripheral direction in a manner offset relative to the first openings. The further openings in particular are formed at least substantially equivalently to the first openings. The cartridge is formed in particular from a plastics material, preferably from polypropylene, and particularly preferably from a polypropylene homopolymer. In particular, the filter unit arranged in the filter housing and the adsorption unit arranged in the adsorption housing can be protected hereby. In particular, water can be made to flow against the filter unit in a particularly homogeneous manner.

The water processing device is not intended to be limited here to the above-described application and embodiment. In particular, the water processing device, in order to comply with the operating principle described herein, can have a number of individual elements, components and units differing from the number stated herein. In addition, values lying within the stated limits are also considered to be disclosed and arbitrarily selectable from the value ranges specified in this disclosure.

BRIEF DESCRIPTION OF THE SEVERAL VIEWS OF THE DRAWING(S)

Further advantages will become clear from the following description of the drawings. The drawings show exemplary embodiments of the invention. The drawings, the description, and the claims contain numerous features in combination. A person skilled in the art will also expediently consider the features individually and combine them to form useful further combinations.

Figure 2:
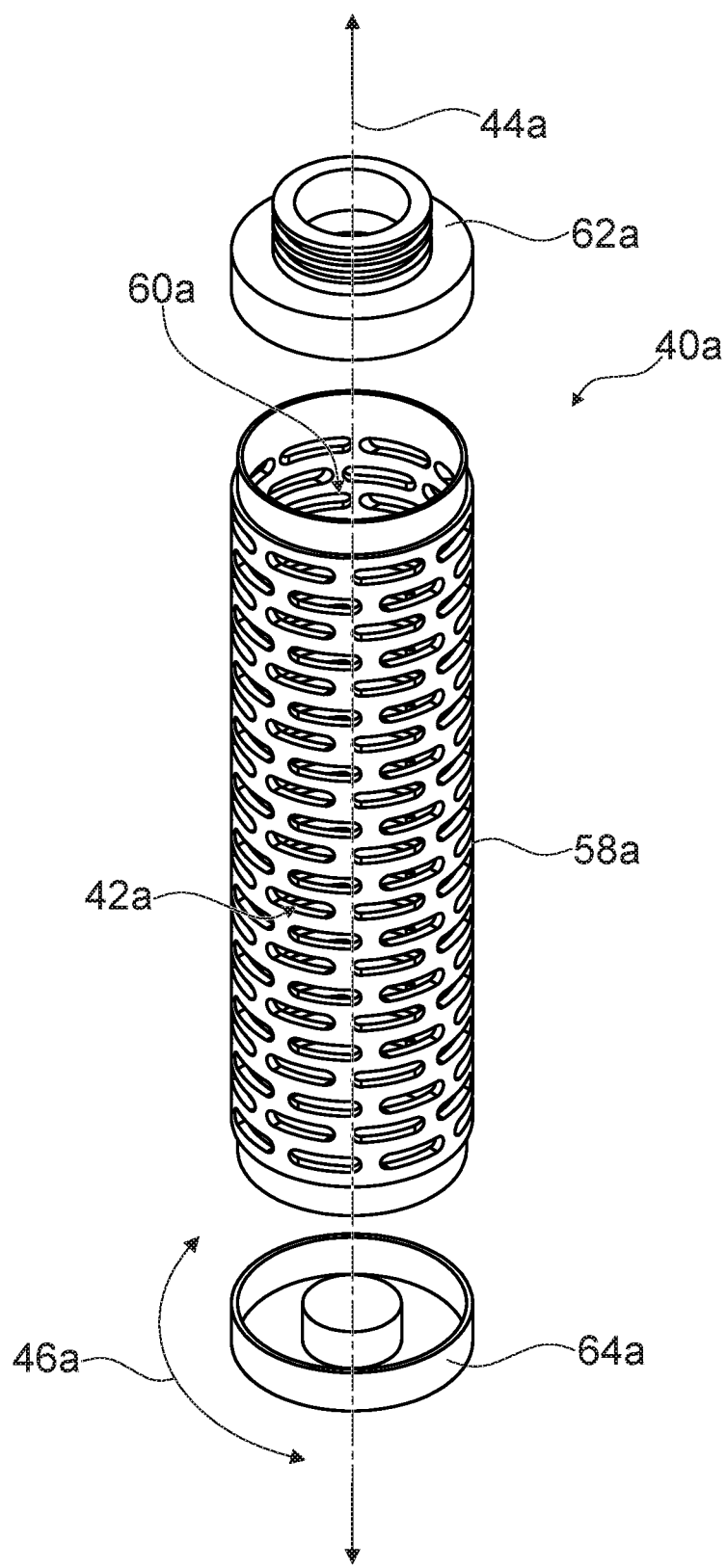
Figure 3:
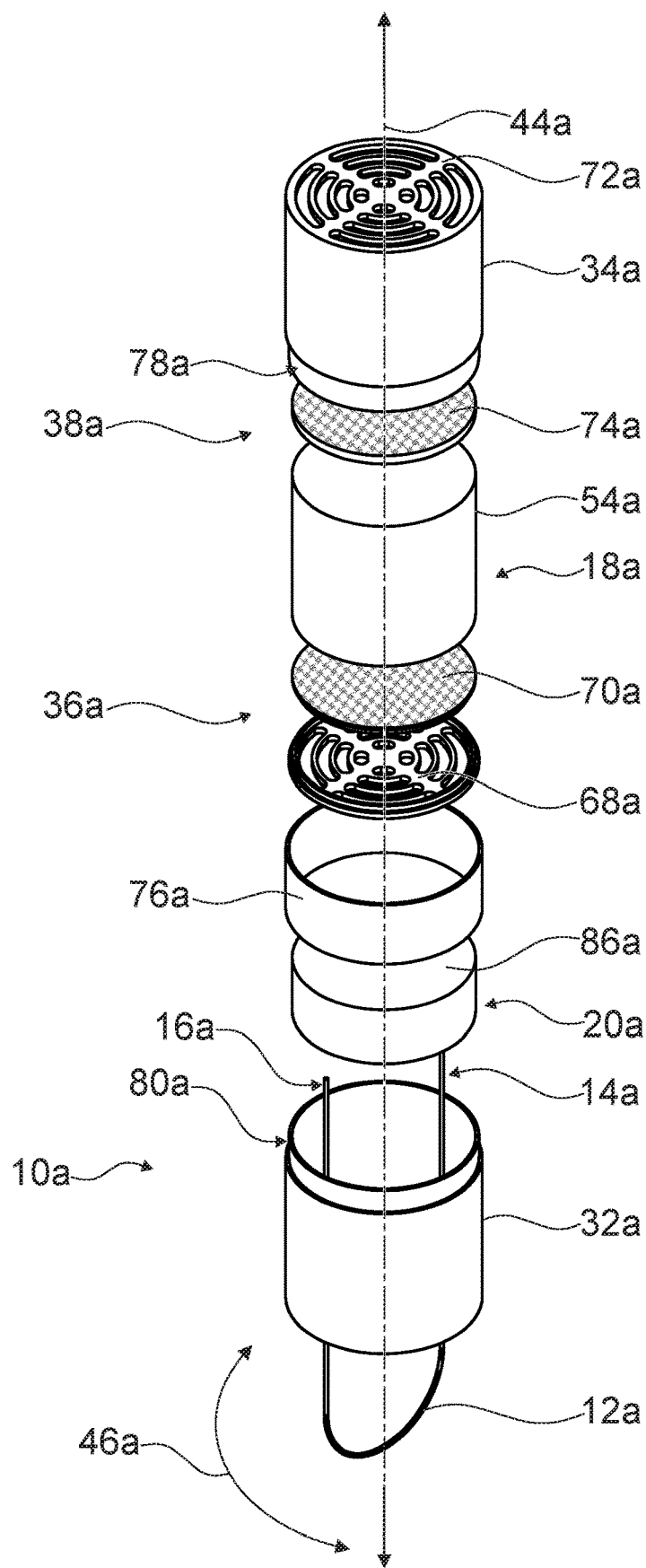
Figure 4:
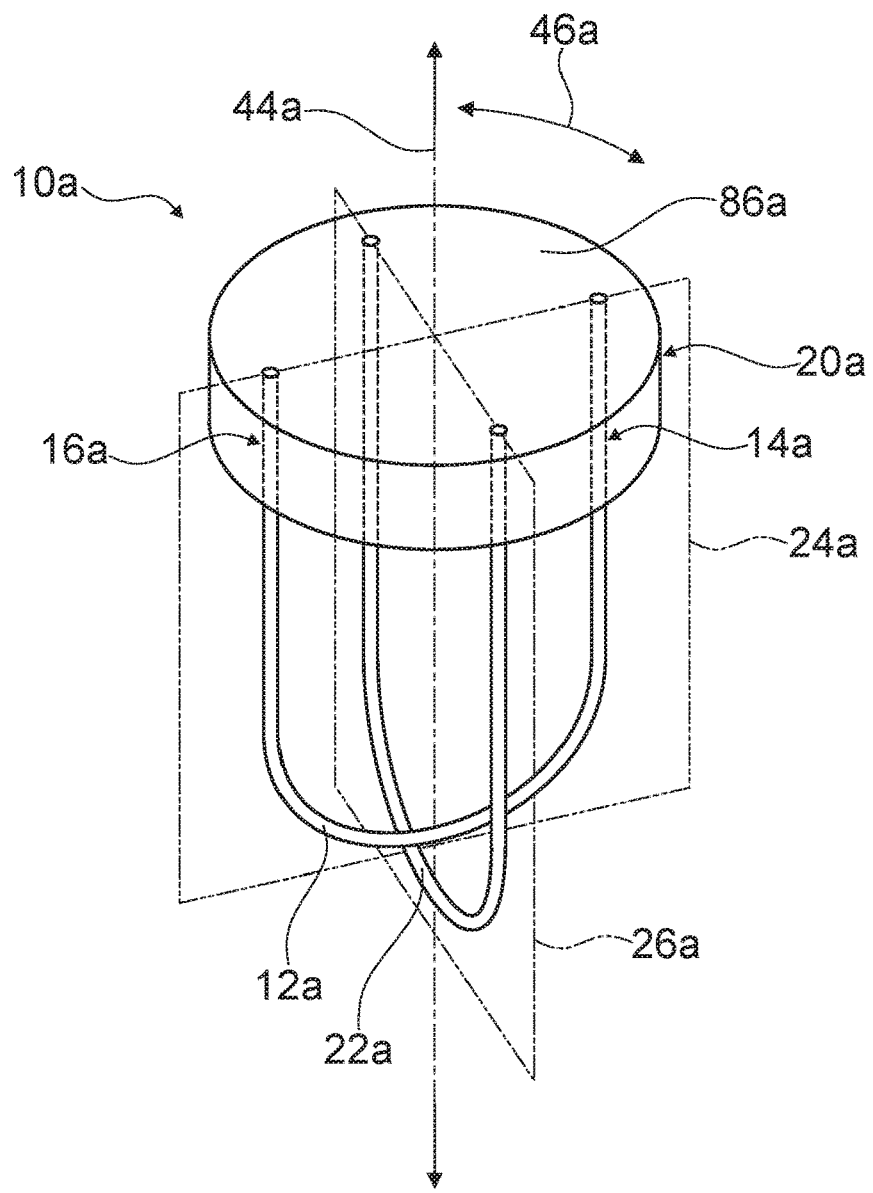
Figure 5:
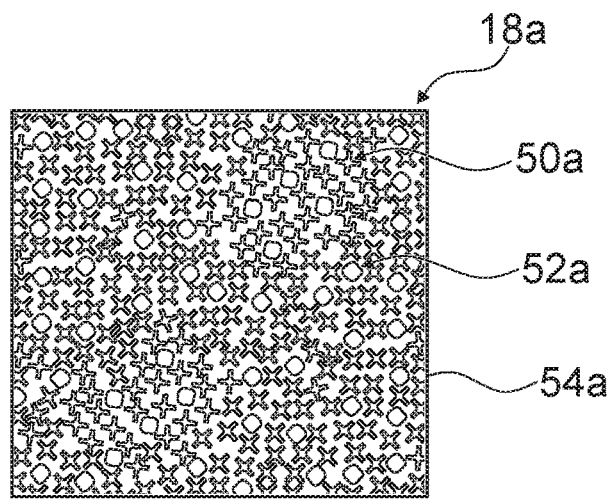
Figure 6:
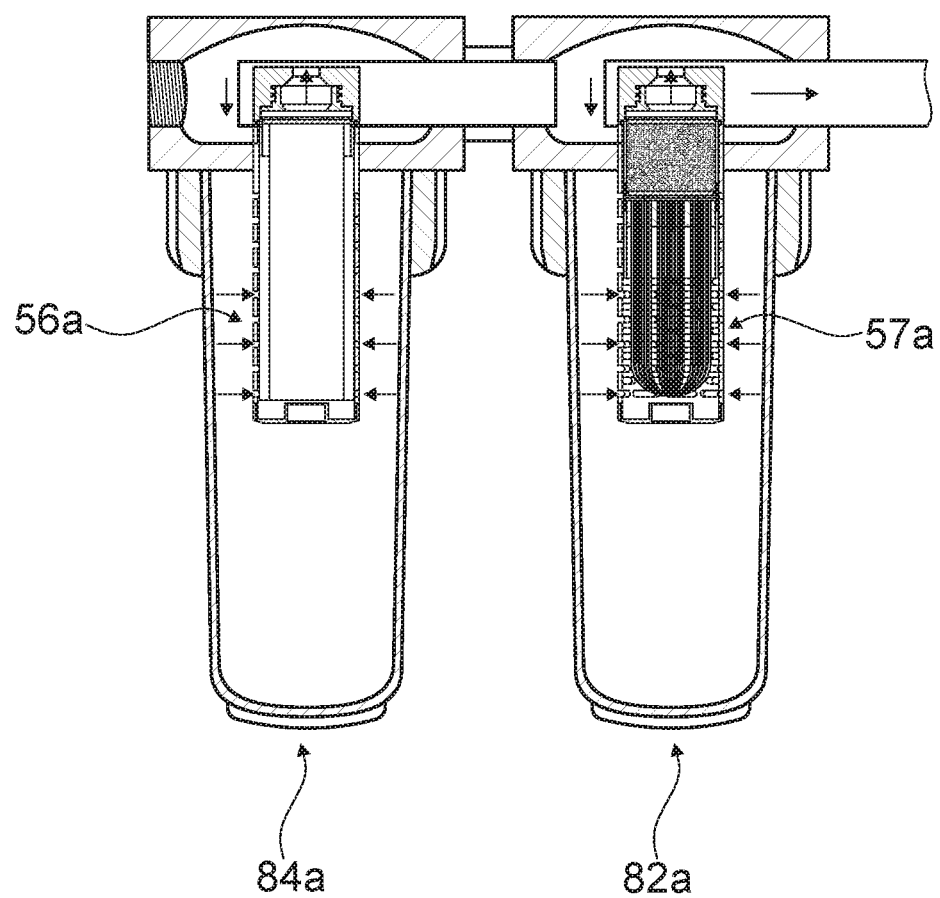
Figure 7:
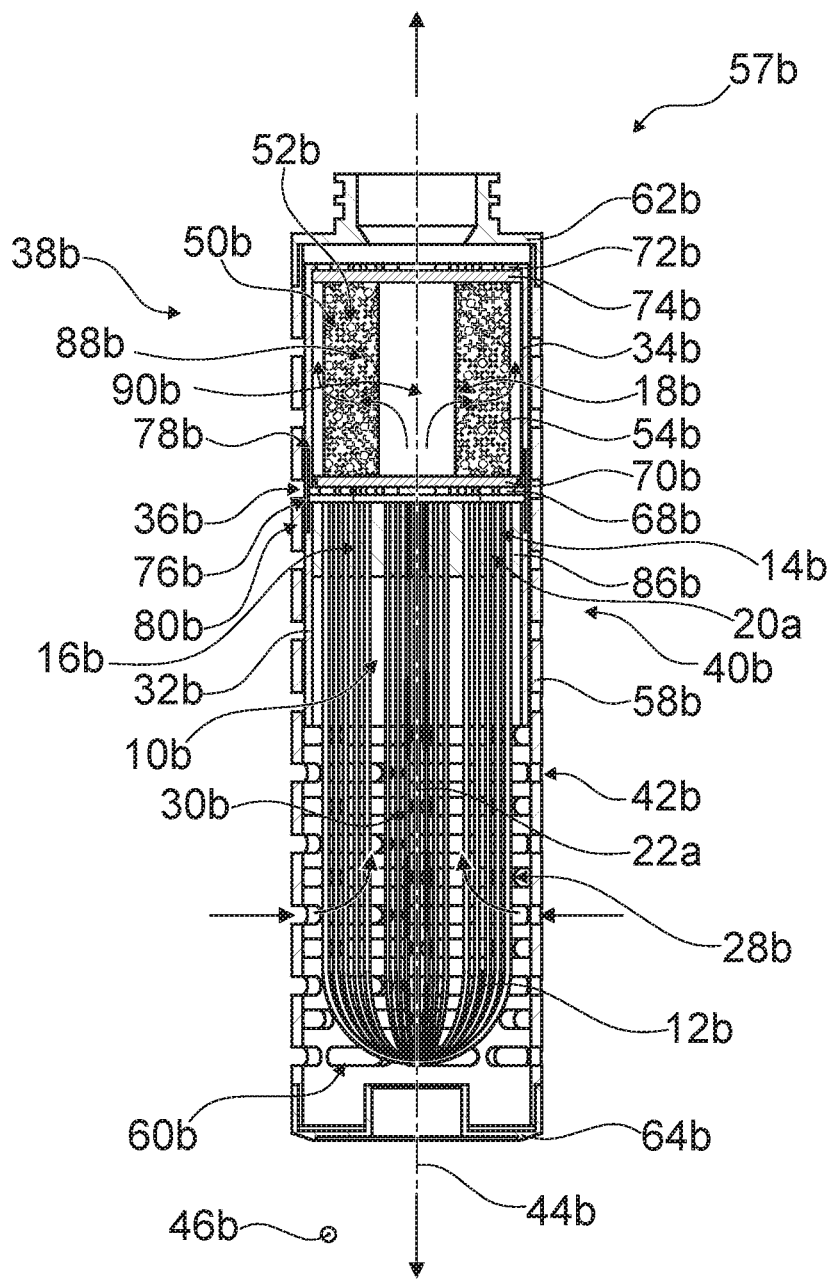
Figure 8:
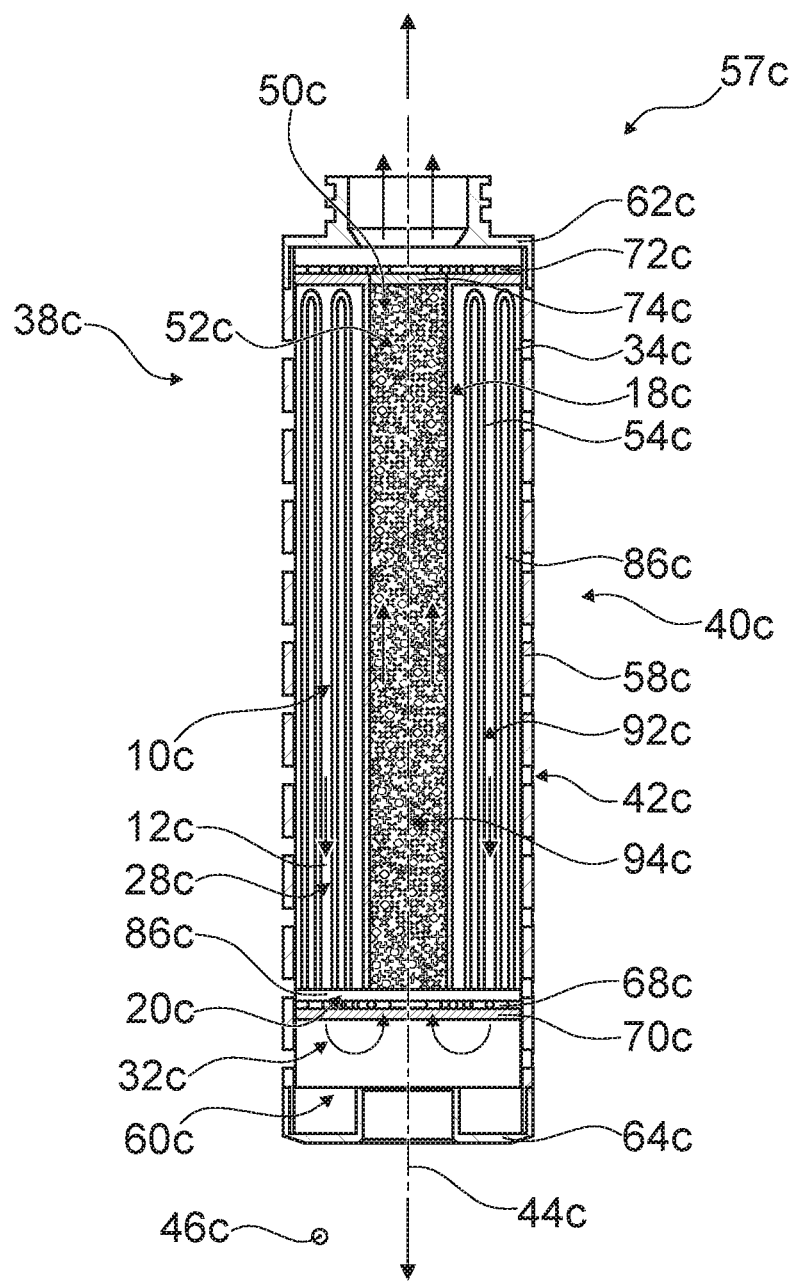
Figure 9:
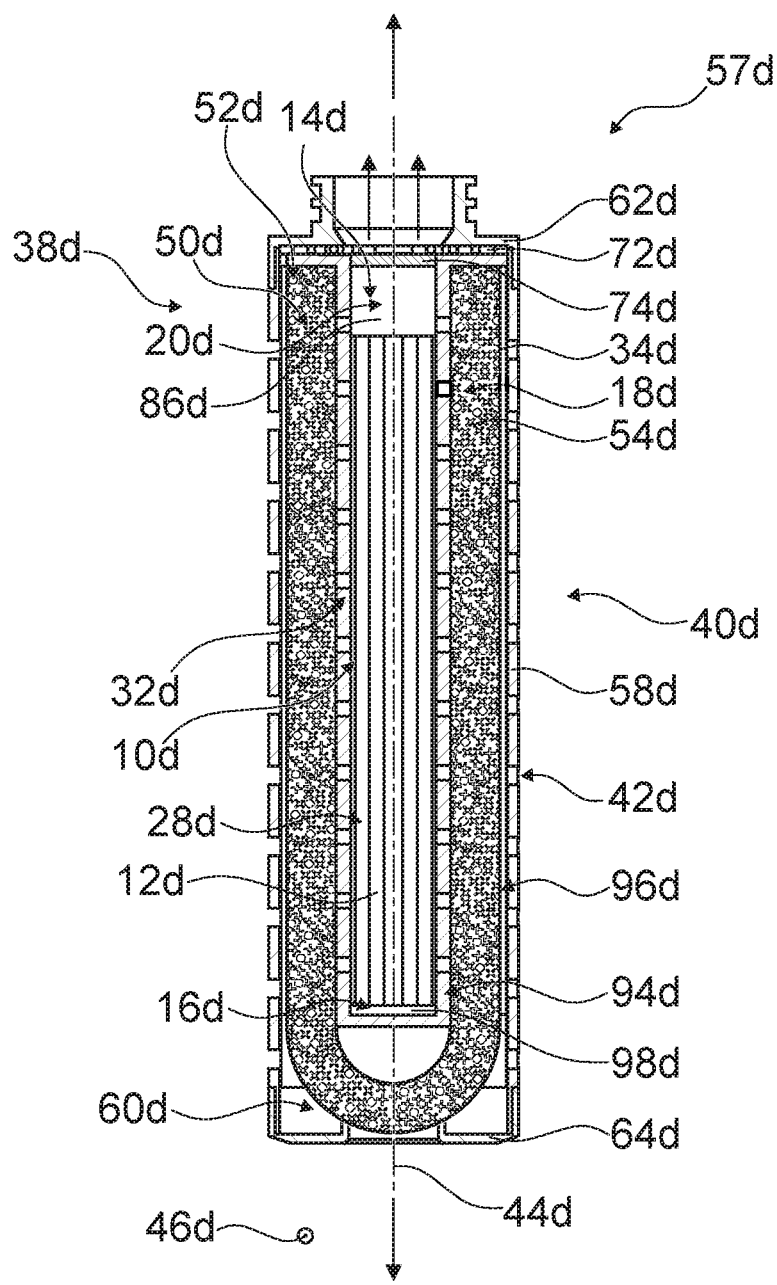

In the drawings:

FIG. 1 shows a water processing cartridge with a water processing device in a sectional view, FIG. 2 shows a cartridge of the water processing device in an exploded view, FIG. 3 shows part of the water processing device in an exploded view, FIG. 4 shows part of a filter unit of the water processing device in a perspective view, FIG. 5 shows part of an adsorption unit of the water processing device in a schematic sectional view, FIG. 6 shows a system with a water processing device and a pre-filtration unit in a schematic sectional view, FIG. 7 shows a further water processing device in a sectional view, FIG. 8 shows an alternative water processing device in a sectional view, and FIG. 9 shows a further alternative water processing device in a sectional view.

DETAILED DESCRIPTION OF THE INVENTION

FIG. 1 shows a water processing cartridge 57a with a water processing device in a sectional view. The water processing device is provided for removing micro-pollutants, in particular medicaments, from water, in particular drinking water. To this end, the water processing cartridge 57a is provided for installation in a system for processing water.

FIG. 2 shows a cartridge 40a of the water processing device. The cartridge 40a is formed to be tubular. The cartridge 40a comprises a cylinder jacket 58a. The cylinder jacket 58a defines, in its interior, a receiving space 60a. The receiving space 60a is used to accommodate further units of the water processing device. The cartridge 40a comprises openings 42a, which are arranged offset relative to one another in the peripheral direction 46a, as considered in the axial direction 44a. The openings 42a are formed by cut-outs, in particular cut-outs perpendicular to the axial direction 44a, in the cylinder jacket 58a. The cartridge 40a comprises a cartridge connector 62a. The cartridge connector 62a is provided for connecting the water processing device to a water pipeline. The cartridge connector 62a comprises a screw thread for connection of the water processing device. The cartridge connector 62a closes the cylinder jacket 58a from one side, in particular in the axial direction 44a. The cartridge 40a also comprises a cartridge termination 64a. The cartridge termination 64a closes the cylinder jacket 58a from a further side, in particular in the axial direction 44a. The cartridge 40a is formed from a plastics material. The cartridge 40a is advantageously formed from polypropylene, more specifically particularly preferably from a polypropylene homopolymer (PP-H).

FIG. 3 shows an exploded view of part of the water processing device. The water processing device comprises a filter housing 32a. The filter housing 32a, when in the assembled state, is arranged in the receiving space 60a of the cartridge 40a. A filter unit 10a of the water processing device is arranged at least partially in the filter housing 32a. The filter unit 10a is arranged within the filter housing 32a to an extent of less than 50%, as considered in the main direction of extent of the filter unit 10a. The filter housing 32a is formed as a hollow cylinder. The filter housing 32a comprises a cylinder jacket, which at least partially surrounds a holding element 20a of the water processing device. The water processing device also comprises an adsorption housing 34a. The adsorption housing 34a, when in the assembled state, is arranged in the receiving space 60a of the cartridge 40a. An adsorption unit 18a of the water processing device is arranged in the adsorption housing 34a. The adsorption housing 34a is formed as a hollow cylinder. The adsorption housing 34a comprises a cylinder jacket, which at least partially surrounds the adsorption unit 18a. In an operating state in which water is flowed through the water processing device, the filter housing 32a is arranged upstream of the adsorption housing 34a as considered in the flow direction.

The water processing device comprises a screen unit 38a. The screen unit 38a separates the filter housing 32a and the adsorption housing 34a from one another. The screen unit 38a also at least partially closes the adsorption housing 34a from at least one side. The screen unit 38a comprises the screen cover 68a. The screen cover 68a at least partially closes the adsorption unit from one side. The screen cover 68a also separates the adsorption unit 18a from the filter unit 10a. The screen cover 68a is connected to the adsorption housing 34a with positive engagement. The screen cover 68a could also be connected to the adsorption housing 34a in a force-locking manner and/or with a substance-to-substance bond. Alternatively or additionally, the screen cover 68a can be formed in one piece with the adsorption housing 34a. The screen cover 68a comprises a plurality of through-openings. The through-openings are provided for enabling a flow of water between the filter unit 10a and the adsorption unit 18a.

The screen unit 38a comprises at least one frit 70a. The frit 70a is planar. The frit 70a is produced from a porous material. The frit 70a is produced from a cross-linked polyethylene. The frit 70a is arranged on a side of the screen unit 38a facing towards the adsorption unit 18a. The frit 70 is arranged in the adsorption housing 34a. The frit 70a is arranged after the screen cover 68a and in particular before the adsorption unit 18a, as considered in the direction of flow. The frit 70a is provided for preventing contamination of the adsorption unit 18a and preferably for preventing the adsorption unit 18a from escaping at least in part from the adsorption housing 34a.

The screen unit 38a comprises a further screen cover 72a. The further screen cover 72a is formed at least substantially equivalently to the screen cover 68a. The further screen cover 72a is formed in one piece with the adsorption housing 34a. It is conceivable that the further screen cover 72a is formed separately from the adsorption housing 34a and in particular is connected thereto in a frictionally engaged and/or positively engaged manner. The further screen cover 72a closes the adsorption housing 34a at least partially from at least one further side. The further screen cover 72a is arranged after the adsorption unit 18a as considered in the direction of flow. The screen unit 38a also comprises a further frit 74a. The further frit 74a is formed at least substantially equivalently to the first frit 70a. The further frit 74a is arranged in the adsorption housing 34a. The further frit 74a is arranged after the adsorption unit 18a and in particular before the further screen cover 72a, as considered in the direction of flow.

The water processing device comprises a connection unit 36a. The connection unit 36a, in the assembled state, connects the adsorption housing 34a and the filter housing 32a to one another, in particular with positive engagement. Alternatively or additionally, the connection unit 36a can also be provided for a force-locking connection and/or a substance-to-substance bond. For example, it is conceivable that the connection unit 36a comprises a thread for an additional force-locking connection. The connection unit 36a comprises at least one connection element 76a, which, in the assembled state, connects the filter housing 32a to the adsorption housing 34a. The connection element 76a is formed separately from the adsorption housing 34a and/or the filter housing 32a. Alternatively or additionally, the connection element 76a can be formed at least partially in one piece with the filter housing 32a and/or the adsorption housing 34a. The connection element 76a is formed as a sleeve.

The connection unit 36a comprises at least one connection element receptacle 78a, which is provided for receiving the connection element 76a. The connection element receptacle 78a is formed correspondingly to the connection element 76a. The connection element receptacle 78a is formed as a recess in the adsorption housing 34a. The connection unit 36a comprises a further connection element receptacle 80a. The further connection element receptacle 80a is formed at least substantially equivalently to the connection element receptacle 78a. The further connection element receptacle 80a is formed as a recess in the filter housing 32a.

At the time of assembly of the water processing device, the further frit 74a is arranged in the adsorption housing 34a. The adsorption unit 18a is also arranged in the adsorption housing 34a, in particular after the further frit 70a as considered in the flow direction. The frit 70a is arranged in the adsorption housing 34a, in particular after the adsorption unit 18a as considered in the flow direction. The screen cover 68a closes the adsorption housing 34a. The filter unit 10a is arranged in the filter housing 32a. The filter housing 32a is arranged after the adsorption housing 34a as considered in the flow direction. The connection unit 36a connects the adsorption housing 34a and the filter housing 32a. The connection element 76a engages in the connection element receptacle 78a. The connection element 76a engages in the further connection element receptacle 80a. The filter housing 32a and the adsorption housing 34a are arranged in the receiving space 60a of the cartridge 40a. The cylinder jacket 58a is closed by the cartridge termination 64a. The cylinder jacket 58a is also connected to the cartridge connector 62a. The cartridge 40a can also be arranged in a superior housing 82a (see FIG. 6).

Part of the filter unit 10a is shown schematically in FIG. 4. The filter unit 10a is provided for at least one filtering of the water in an operating state of the water processing device. The filter unit 10a is formed as a membrane filter unit. The filter unit 10a comprises at least one filter element 12a. The filter unit 10a comprises in particular a multiplicity of filter elements 12a, 22a, wherein only two filter elements 12a, 22a equivalent to one another have been illustrated in FIG. 4 for the sake of clarity. The filter element 12a is tubular. The filter element 12a is formed as a filter membrane. The filter membrane is a hollow-fibre filter membrane. The filter element 12a comprises a wall. The wall forms the filter membrane. The wall defines a hollow channel of the filter element 12a. The filter element 12a comprises a first end portion 14a and a second end portion 16a. The end portions 14a, 16a extend along the filter element 12 over at most 5 cm. The end portions 14a, 16a are arranged fixedly relative to one another by means of the holding element 20a of the water processing device. The end portions 14a, 16a of the filter element 12a are fixedly connected to the holding element 20a. The holding element 20a is formed as a flat block. The holding element 20a is connected to the filter housing 32a by a substance-to-substance bond. The holding element 20a is advantageously formed from a binder 86a. The binder 86a is an epoxy resin. It is conceivable that another binder 86a can be used, for example an adhesive and/or a plastics material. The end portions 14a, 16a are sealed off prior to assembly of the filter element 12a, in such a way that the binder 86a does not contaminate the filter element 12a, in particular the wall of the filter element 12a. At the time of assembly, the filter housing 32a is filled with the binder 86a. The end portions 14a, 16a of the filter element 12a are arranged in the binder 86a, which is still liquid. The binder 86a is cured to form the holding element 20a. The cured binder 86a is also ground in such a way that openings in the end portions 14a, 16a of the filter element 12a are exposed.

The filter element 12a is bent at least in portions in the assembled state and in particular has a loop shape. The filter element 12a is bent in such a way that the end portions 14a, 16a of the filter element 12a enclose an inner angle of from 0° to 90°. In the present case the end portions 14a, 16a are at least substantially parallel or preferably antiparallel to one another, such that the filter element 12a is preferably bent in a U shape. In the present case, the inner angle is consequently approximately 0°. The filter element 12a in particular has a plane of main extent 24a. The filter element 12a is intersected by the plane of main extent 24a over the entire extent of the filter element 12a.

The filter unit 10a also comprises at least one further filter element 22a. A further filter element 22a is formed at least substantially equivalently to the filter element 12a, in particular is shaped equivalently thereto and is advantageously fastened equivalently to the holding element 20a. The filter element 12a and the further filter element 22a differ from one another by a length. The further filter element 22a surrounds the filter element 12a at least in part. The further filter element 22a has a further plane of main extent 26a. In the assembled state, the further plane of main extent 26a of the further filter element 22a is different from the plane of main extent 24a of the filter element 12a. The plane of main extent 24a of the filter element 12a and the further plane of main extent 26a of the further filter element 22a are arranged at an angle to one another. In the present case, the plane of main extent 24a of the filter element 12a and the further plane of main extent 26a of the further filter element 22a are at least substantially perpendicular to one another. The planes of main extent 24a, 26a can also be arranged at a different angle to one another, in particular from 20° to 160°, or alternatively can be arranged at least substantially parallel to one another.

The filter unit 10a also comprises a group 28a (see FIG. 1) of filter elements 12a. The group 28a of filter elements 12a comprises at least one additional filter element 12a, in particular a plurality of additional filter elements 12a, which is/are formed at least substantially equivalently to the filter element 12a. The filter elements 12a of the group 28a are in particular bundled by means of a mesh of the water processing device. The filter unit 10a also comprises a further group 30a (see FIG. 1) of further filter elements 22a. The further group 30a of further filter elements 22a comprises at least one additional further filter element 22a, in particular a plurality of additional further filter elements 22a, which is/are at least substantially equivalent to the further filter element 22a. The filter elements 22a of the group 30a are bundled in particular by means of a further mesh of the water processing device. Alternatively or additionally, the filter unit 10a can comprise just one of the groups 28a, 30a or additional groups.

In FIG. 5 the adsorption unit 18a is shown schematically in a sectional view. The adsorption unit 18a comprises a non-specific adsorption element 50a. The adsorption unit 18a can consist of the non-specific adsorption element 50a to an extent of at least 10% and at most 98%. In the present case, the adsorption unit 18a consists of the non-specific adsorption element 50a to an extent of 80%. In particular, the adsorption unit 18a can also consist of the non-specific adsorption element 50a to an extent of further values from 10% to 98%.

The non-specific adsorption element 50a comprises at least one organic adsorbent. In the present case, the organic adsorbent is activated carbon. The organic adsorbent is present here in the form of a cylindrical block. The organic adsorbent is activated carbon, in particular sintered granulated activated carbon. Alternatively or additionally, the organic adsorbent can be present in the form of a fill, in particular in granulated form. The non-specific adsorption element 50a comprises a main body 54a. The main body 54a forms the adsorption unit 18a to a large extent. The adsorption unit 18a comprises an adsorbent, which forms the main body 54a of the adsorption unit 18a at least in part. In the present case, the organic adsorbent forms the main body 54a at least in part. Alternatively, the organic adsorbent can form the main body 54a completely.

The non-specific adsorption element 50a also comprises at least one mineral adsorbent. The non-specific adsorption element 50a at least comprises the mineral adsorbent to an extent of 5% to 20%. In the present case, the non-specific adsorption element 50a comprises a mineral adsorbent to an extent of 5%. In the present case, the mineral adsorbent is bentonite. The mineral adsorbent also forms the main body 54a of the non-specific adsorption element 50a at least in part. Alternatively or additionally, the non-specific adsorption element 50a can comprise diatomaceous earth, silica gel, alumina and/or zinc oxide as mineral adsorbent.

The adsorption unit 18a comprises a specific adsorption element 52a. The adsorption unit 18a can consist of the specific adsorption element 52a to an extent of at least 2% and at most 90%. In the present case, the adsorption unit 18a consists of the specific adsorption element 52a to an extent of 20%. In particular, the adsorption unit 18a can also consist of the specific adsorption element 52a to an extent of further values of from 2% to 90%. The specific adsorption element 52a comprises at least one specific adsorbent.

Alternatively or additionally, the main body 54a of the adsorption unit 18a can be formed at least in part of a specific adsorbent.

The specific adsorption element 52a comprises at least one reversed-phase adsorbent, such as a cross-linked, functionalised organic polymer. The specific adsorption element 52a preferably comprises a cross-linked ethylvinylbenzene as reversed-phase adsorbent. The specific adsorption element 52a further comprises at least one ion exchanger adsorbent. The ion exchanger adsorbent can be formed as a cation exchanger or anion exchanger. In the present case, the ion exchanger adsorbent is formed as an anion exchanger. The ion exchanger adsorbent is an agarose, which is functionalised by means of an ammonium group, preferably a quaternary ammonium group, and particularly preferably diethylaminoethyl (DEAE). The specific adsorption element 52a also comprises at least one adsorbent, which is provided for adsorption by means of hydrogen bridges. In the present case, the adsorbent which is provided for adsorption by means of hydrogen bridges is linear and/or cross-linked polyvinylpyrrolidone (PVPP). The specific adsorption element 52a also comprises at least one complexing agent adsorbent. In the present case, the complexing agent adsorbent is ethylenediaminetetraacetic acid (EDTA). Alternatively or additionally, the specific adsorbent 52a can comprise further specific adsorbents.

The non-specific adsorption element 50a and the specific adsorption element 52a are at least partially in contact with one another. The non-specific adsorption element 50a and the specific adsorption element 52a are arranged at least partially within one another and in particular are mixed with one another.

In an operating state, water that is to be cleaned is flowed through the water processing device fully (see FIG. 1). The direction in which the water enters the water processing device is in particular at least substantially perpendicular to a direction in which the water leaves the water processing device. The water enters the water processing device through the openings in the cartridge 40a, in particular at least substantially perpendicularly to the axial direction 44a. The water also enters the filter unit 10a at least substantially perpendicularly to the axial direction 44a. The water passes through the filter element 12a, in particular the wall of the filter element 12a, at least in part. The water is filtered by means of the wall. The water collects inside the filter element 12a, in particular in the hollow channel. The hollow channel guides the water in the direction of the adsorption unit 18a. The water penetrates the adsorption unit 18a, in particular in the axial direction 44a. Micro-pollutants contained in the water are adsorbed by the adsorption unit 18a. The water leaves the water processing device through the cartridge connector 62a, in particular in the axial direction 44a.

FIG. 6 shows a system with the water processing device and with a pre-filtration unit 56a. The pre-filtration unit 56a is arranged upstream of the water processing device in respect of the flow direction. The system is provided for installation in a water pipeline. The pre-filtration unit 56a is formed as a microfiltration unit with a filter membrane and is provided for retaining coarse dirt particles measuring at least 5 μm in size. In alternative embodiments, filter membranes can be used which are suitable for retaining coarse dirt particles having other sizes, for example 20 μm. The micro-pollutants are then removed in the water processing device.

The water processing device is arranged in the superior housing 82a. The superior housing 82a comprises an outlet with a screw thread for connection to a water pipeline. The pre-filtration unit 56a is arranged in a further superior housing 84a. The further superior housing 84a comprises a connector with screw thread for connection to a water pipeline. The pre-filtration unit 56a and the water processing device are arranged relative to one another such that water which enters the further superior housing 84a firstly passes through the pre-filtration unit 56a and then passes into the superior housing 82a, in which the water is processed by means of the water processing device.

Further exemplary embodiments of the invention are shown in FIGS. 7 to 9. The following descriptions and the drawings are limited fundamentally to the differences between exemplary embodiments, wherein reference can also be made in principle to the drawings and/or the description of the other exemplary embodiments, in particular FIGS. 1 to 6, in respect of similarly denoted components, in particular in respect of components having like reference signs. For distinction among the exemplary embodiments, the letter 'a' follows the reference signs of the exemplary embodiment in FIGS. 1 to 6. The letter 'a' is replaced by the letters 'b' to 'd' in FIGS. 7 to 9.

FIG. 7 shows a further water processing device. The exemplary embodiment of FIG. 7 differs from the previous exemplary embodiment at least fundamentally by an adsorption unit 18b of the water processing device. In the present case the adsorption unit 18b is at least substantially tubular. The adsorption unit 18b has a tube wall 88b. The tube wall 88b defines a tube channel 90b. In the operating state, the water to be processed penetrates the adsorption unit 18b at least substantially perpendicularly to an axial direction 44b. The water is guided from a filter unit 10b in the axial direction 44b into the tube channel 90. The tube channel 90b is closed at one end, such that the water penetrates the tube wall 88b of the adsorption unit 18b at least substantially perpendicularly to the axial direction 44b. Once the water has passed through the tube wall 88b, it enters an adsorption housing 34b. The adsorption housing 34b diverts the water in the axial direction 44b.

FIG. 8 shows an alternative water processing device. The exemplary embodiment of FIG. 8 differs from the previous exemplary embodiments at least fundamentally in that a filter unit 10c of the water processing device is tubular. The filter unit 10c comprises a tube wall 92c. The tube wall 92c is formed at least partially by a group 28c of filter elements 12c of the filter unit 10c. The filter elements 12c are arranged in a circle. A holding element 20c of the water processing device, in which the filter elements 12c are arranged, is formed as a circular disc. The circular disc has an opening. The tube wall 92c defines a tube channel 94c. An adsorption housing 34c of the water processing device is arranged within the tube channel 94c. A filter housing 32c, in which the filter unit 10c is arranged at least in part, is closed in the axial direction 44c. If water, in an operating state, leaves the filter elements 12c in the axial direction 44c, the water is diverted in the reverse direction by the filter housing 32c. The water enters the adsorption housing 34c, in particular in the axial direction 44c, through the opening in a holding element 20c.

FIG. 9 shows a further alternative water processing device. The exemplary embodiment of FIG. 9 differs from the previous exemplary embodiments at least substantially in that an adsorption unit 18d of the water processing device is arranged upstream of a filter unit 10d of the water processing device in respect of the direction of flow. In the present case, the water processing device comprises a flexible adsorption casing 96d instead of an adsorption housing.

The adsorption casing 96d is in particular formed as a tubular bag. The adsorption casing 96d is formed from a material such as a nonwoven fabric. The adsorption unit 18d of the water processing device is arranged within the adsorption casing 96d. In the present case, the adsorption casing 96d also surrounds a filter housing 32d of the water processing device. In the present case the filter housing 32d is water-permeable perpendicularly to an axial direction 44d. The filter housing 32d serves as a spacer between the filter unit 10d and the adsorption unit 18d. The filter unit 10d comprises a group 28d of filter elements 12d. The filter elements 12d are straight. In the present case the water processing device comprises two holding elements 20d, 98d for end portions 14d, 16d of the filter elements 12d.

The invention claimed is:

1. A water processing device which is provided for removing micro-pollutants from water, the device comprising at least one filter unit which is provided for at least one filtering of water in at least one operating state and which comprises at least one tubular filter element with at least two end portions, and comprising at least one adsorption unit which adsorbs the micro-pollutants in at least one operating state, wherein the end portions enclose an inner angle of from 0° to 90° when in an assembled state, wherein the water processing device further comprises a filter housing, in which the at least one filter unit is arranged, and an adsorption housing, in which the at least one adsorption unit is arranged, wherein the water processing device comprises a cartridge, in which, in the assembled state, the adsorption housing and the filter housing are arranged and which comprises openings, which are arranged offset relative to one another in the peripheral direction, as considered in an axial direction.

2. The water processing device according to claim 1, wherein the filter element is bent substantially in a U shape in the assembled state.

3. The water processing device according to claim 1, further comprising a holding element, which arranges the at least two end portions fixedly relative to one another in the assembled state.

4. The water processing device according to claim 1, wherein the filter unit comprises at least one further filter element, which is formed at least substantially equivalently to the filter element and which surrounds the filter element.

5. The water processing device according to claim 4, wherein the filter element in the assembled state comprises a plane of main extent, and the at least one further filter element in the assembled state has a further plane of main extent, which is different from the plane of main extent of the filter element.

6. The water processing device according to claim 5, wherein the plane of main extent of the filter element and the further plane of main extent of the further filter element are arranged at an angle to one another.

7. The water processing device according to claim 4, wherein the filter unit comprises a group of filter elements and a further group of further filter elements.

8. The water processing device according to claim 1, wherein the at least one filter unit is substantially tubular.

9. The water processing device according to claim 1, wherein the at least one adsorption unit is substantially tubular.

10. The water processing device according to claim 1, wherein the filter housing is arranged upstream of the adsorption housing in respect of direction of flow.

11. The water processing device according to claim 1, further comprising a connection unit, which connects the adsorption housing and the filter housing to one another in the assembled state.

12. The water processing device according to claim 1, further comprising at least one screen unit, which separates the filter housing and the adsorption housing from one another and closes at least the adsorption housing from at least one side.

13. The water processing device of claim 1, provided for removing medicaments from water.

* * * * *